United States Patent
Polburn et al.

(10) Patent No.: US 7,350,681 B2
(45) Date of Patent: Apr. 1, 2008

(54) CARGO ORGANIZER SYSTEM FOR A BENCH SEAT OF A VEHICLE

(75) Inventors: Justin K. Polburn, Charlotte, NC (US); Rachel L. Polburn, Charlotte, NC (US)

(73) Assignee: Jay-Ray Products, Inc., Charlotte, NC (US)

( * ) Notice: Subject to any disclaimer, the term of this patent is extended or adjusted under 35 U.S.C. 154(b) by 419 days.

(21) Appl. No.: 10/877,835

(22) Filed: Jun. 25, 2004

(65) Prior Publication Data

US 2004/0262345 A1 Dec. 30, 2004

Related U.S. Application Data

(60) Provisional application No. 60/483,446, filed on Jun. 26, 2003.

(51) Int. Cl.
*B60R 7/00* (2006.01)
*B62J 7/06* (2006.01)

(52) U.S. Cl. .............. 224/275; 224/282; 297/188.06; 296/37.16

(58) Field of Classification Search ............. 224/275, 224/585, 572; 297/188.04, 188.05, 188.06, 297/188.07, 188.2; 108/44; 296/37.5, 37.15, 296/37.16; D12/416, 221; 211/150
See application file for complete search history.

(56) References Cited

U.S. PATENT DOCUMENTS

| | | | |
|---|---|---|---|
| 1,158,885 A * | 11/1915 | Beck | 224/549 |
| 2,100,261 A * | 11/1937 | Montgomery | 224/275 |
| 2,889,097 A | 6/1959 | Broehl | |
| 3,175,743 A * | 3/1965 | Richard | 224/549 |
| 3,291,520 A | 12/1966 | Smith | |
| 3,393,936 A | 7/1968 | Hall | |
| 4,443,034 A | 4/1984 | Beggs | |
| 4,807,927 A * | 2/1989 | Livick | 297/184.15 |
| 4,969,793 A | 11/1990 | Pawl | |
| 5,046,433 A * | 9/1991 | Kramer et al. | 108/44 |
| 5,492,257 A * | 2/1996 | Demick | 224/275 |
| 5,669,537 A | 9/1997 | Saleem et al. | |
| 5,720,697 A * | 2/1998 | Winkel | 482/41 |
| 5,816,419 A * | 10/1998 | Lamson | 211/150 |
| 5,829,655 A * | 11/1998 | Salopek | 224/402 |
| 5,967,054 A | 10/1999 | Rosenfeld | |
| D419,520 S * | 1/2000 | Bergh | D12/416 |
| 6,050,202 A | 4/2000 | Thompson | |
| 6,105,839 A * | 8/2000 | Bell | 224/275 |
| 6,113,172 A | 9/2000 | Chaloult et al. | |
| 6,135,332 A * | 10/2000 | Eleam | 224/275 |
| 6,176,535 B1 | 1/2001 | Chaloult et al. | |
| 6,386,412 B1 * | 5/2002 | Konechne | 224/543 |

(Continued)

*Primary Examiner*—Nathan J. Newhouse
*Assistant Examiner*—Corey N Skurdal
(74) *Attorney, Agent, or Firm*—Clements Bernard Miller; Lawrence A. Baratta, Jr.; Christopher L. Bernard (57) ABSTRACT

A cargo organizer system for a bench seat of a vehicle that includes mounting straps, an adjustable tube frame, and a collapsible shelf assembly. The shelf assembly is configurable in a vertical stored position and a horizontal use position. Dividers are positionable by the user to divide the shelf into user sized compartments. Netting can be provided for securing items in the compartments during sudden stops. Alternatively, the shelf assembly can be made from a cloth interior forming a pouch within a tubular support periphery.

24 Claims, 6 Drawing Sheets

U.S. PATENT DOCUMENTS

| | | | |
|---|---|---|---|
| 6,401,995 B1 * | 6/2002 | Yuille et al. | 224/404 |
| 6,607,241 B2 * | 8/2003 | Johnston | 297/188.06 |
| 6,629,726 B2 * | 10/2003 | Johnston | 297/188.06 |
| 6,672,640 B2 | 1/2004 | Gehring et al. | |
| 6,719,347 B2 * | 4/2004 | Gehring et al. | 296/37.5 |

\* cited by examiner

CARGO ORGANIZER SYSTEM FOR A BENCH SEAT OF A VEHICLE

CROSS-REFERENCE TO RELATED APPLICATION

This application claims priority from Provisional Patent Application No. 60/483,446 filed on Jun. 26, 2003.

FIELD OF THE INVENTION

The present invention relates to systems for securing items in a vehicle and more particularly to a cargo organizer system for a bench seat of a vehicle that can be easily installed and removed without damage to the cargo area of the vehicle. The invention further relates to a cargo organizer system that can be easily manipulated into a "stored" position when not in use, such that substantially all of the cargo area is available for use.

BACKGROUND OF THE INVENTION

Loose items positioned in a vehicle passenger compartment become dangerous projectiles when the vehicle's speed and/or the vehicle's direction are abruptly changed. It would, therefore, be desirable to have a cargo organizer system for a vehicle that could be readily installed and configured for particular uses by a vehicle owner and which included item movement restriction structures such as user sized item compartments, securing netting and a sealable storage bag.

Shelves and other retaining devices that are known in the art are generally made of molded plastic, and are retained by elements that are integral to the storage compartment of the vehicle, as is generally taught in U.S. Pat. No. 6,113,172 issued to Chaloult et al. Other shelving devices require a recess within the floor or other area of the vehicle in order to hide the stored shelf. Such recesses must be manufactured into the car, or installed through a costly after-market procedure. Other shelves that do not require lengthy installation processes rely on screws and bolts to attach the shelving to the seat back or inside wall panels of the vehicle. Attaching the shelf in such a way can leave the inside of the vehicle scratched and disfigured should one ever wish to remove the shelf. Thus, the prior art is deficient in providing an after-market shelf that is easily installed within and removed from the cargo area of vans, minivans, and sport utility vehicles.

GENERAL SUMMARY DISCUSSION OF INVENTION

It is thus an object of the invention to provide a cargo organizer system for a bench seat of a vehicle that includes multiple mounting straps, two adjustable length strap assemblies, an adjustable tube frame, and a collapsible shelf assembly; two of the mounting straps are secured to the top of the tube frame in a manner to form two supports securable about the head rests of a vehicle bench seat such that the tube frame is secured in a vertical position against the back of a vehicle bench seat; an item retaining netting assembly; two additional mounting straps are secured to the bottom vertical tubes of the adjustable tube frame and are securable about the base of a vehicle bench seat to maintain the tube frame in a vertical orientation against the back of the bench seat; the height of the collapsible shelf with respect to the tube frame is adjustable with a height adjustment mechanism; the collapsible shelf is pivotally secured along an edge thereof to the bottom of the tube frame and is moveable between a vertical stored position and a horizontal use position; the collapsible shelf is supported in both the vertical stored and the horizontal use positions as determined by the selected lengths of the two adjustable length strap assemblies; each of the two adjustable length strap assemblies is secured between the collapsible shelf and the tube frame; the collapsible shelf is provided with a number of shelf connectable dividers that are configurable in connection with the collapsible shelf to form a number of separate shelf item retaining compartments; the item retaining netting assembly is securable to either the collapsible shelf and/or the tube frame to secure and cover items supported on the collapsible shelf; the cargo organizer system is easily taken apart and the compartment dividers stored in a storage bag that, when not used for storing the compartment dividers, is stored by attaching the storage bag to the tube frame.

Accordingly, a cargo organizer system for a bench seat of a vehicle is provided. The cargo organizer system for a bench seat of a vehicle includes multiple mounting straps, two adjustable length strap assemblies, an adjustable tube frame, and a collapsible shelf assembly; two of the mounting straps are secured to the top of the tube frame in a manner to form two supports securable about the head rests of a vehicle bench seat such that the tube frame is secured in a vertical position against the back of a vehicle bench seat; an item retaining netting assembly; two additional mounting straps are secured to the bottom vertical tubes of the adjustable tube frame and are securable about the base of a vehicle bench seat to maintain the tube frame in a vertical orientation against the back of the bench seat; the height of the collapsible shelf with respect to the tube frame is adjustable with a height adjustment mechanism; the collapsible shelf is pivotally secured along an edge thereof to the bottom of the tube frame and is moveable between a vertical stored position and a horizontal use position; the collapsible shelf is Supported in both the vertical stored and the horizontal use positions as determined by the selected lengths of the two adjustable length strap assemblies; each of the two adjustable length strap assemblies is secured between the collapsible shelf and the tube frame; the collapsible shelf is provided with a number of shelf connectable dividers that are configurable in connection with the collapsible shelf to form a number of separate shelf item retaining compartments; the item retaining netting assembly is securable to either the collapsible shelf and/or the tube frame to secure and cover items supported on the collapsible shelf; the cargo organizer system is easily taken apart and the compartment dividers stored in a storage bag that, when not used for storing the compartment dividers, is stored by attaching the storage bag to the tube frame.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION OF A PREFERRED EMBODIMENT

Figure 1:
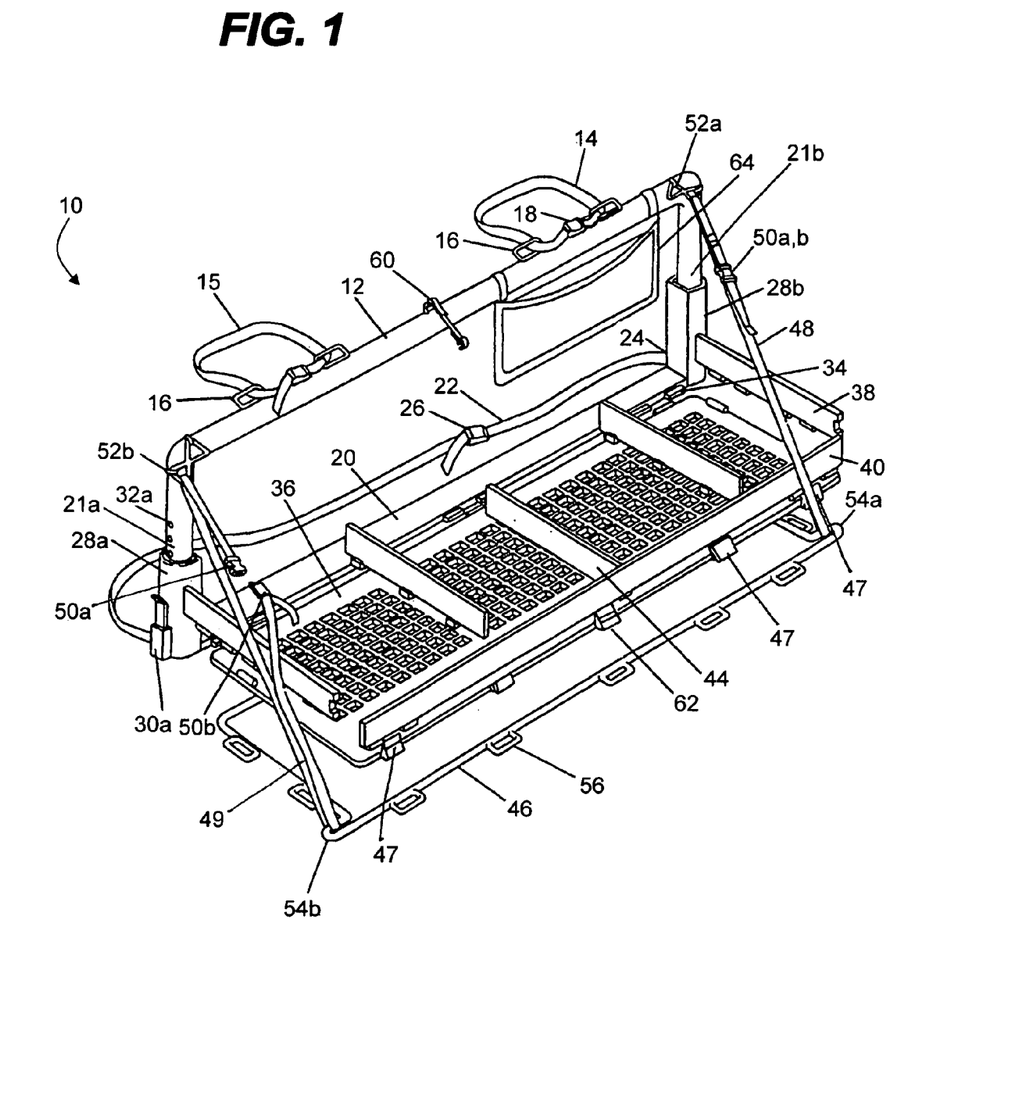
FIG. 1 is a perspective view of an exemplary embodiment of the cargo organizer system for a bench seat of a vehicle of the present invention.

Referring now to FIG. 1, a cargo organizer 10 for the bench seat of a vehicle is shown. The cargo organizer 10 consists generally of a c-shaped tubular frame 12, a frame base 20, and a base tray 36. Each of the frame 12, base 20 and tray 36 can be made of any substantially rigid material that is capable of supporting the weight of the cargo organizer as well as any cargo that will be contained therein. Acceptable materials include metals, metal alloys, thermoplastics, thermosets, and combinations thereof.

Figure 2:
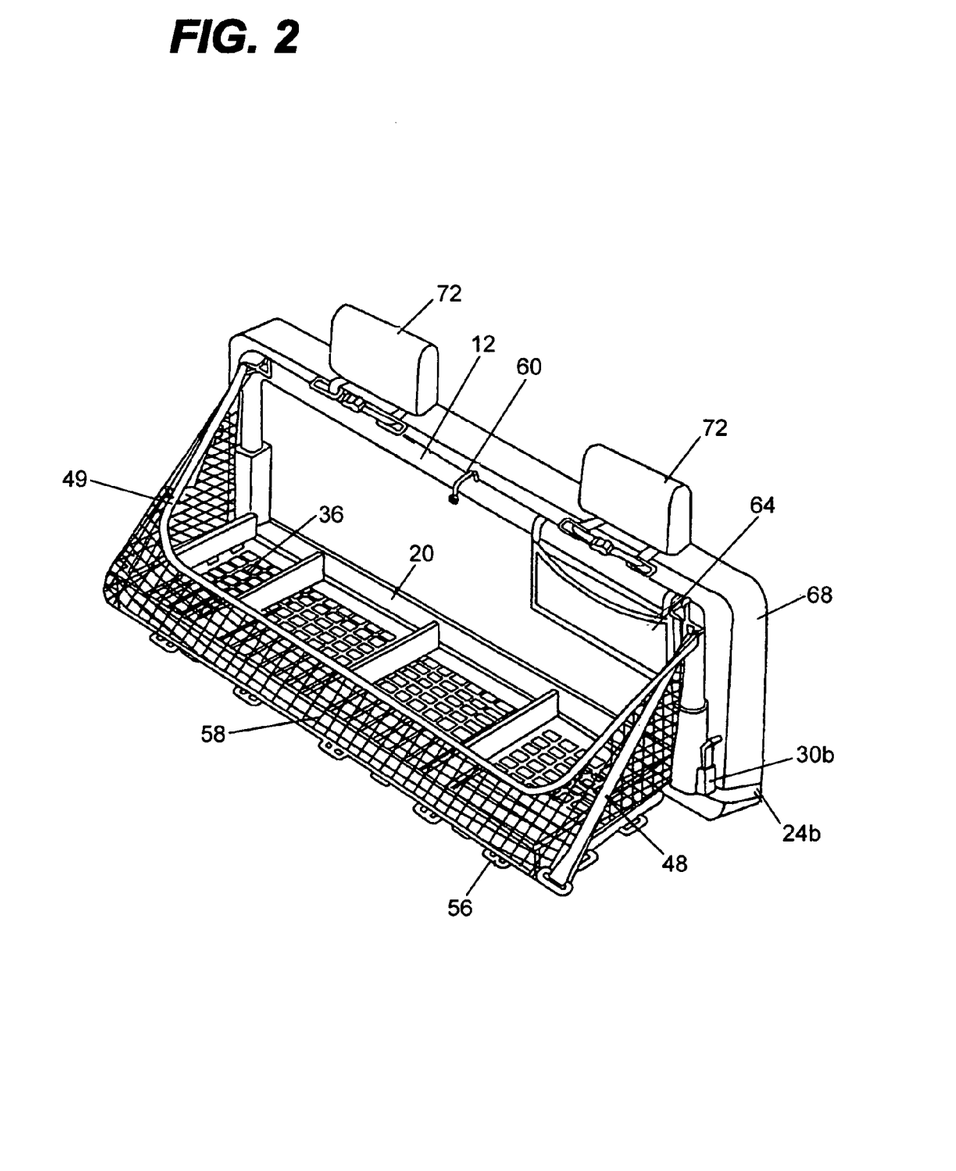
FIG. 2 is a perspective view of the cargo organizer system showing an alternate embodiment thereof.
Figure 6:
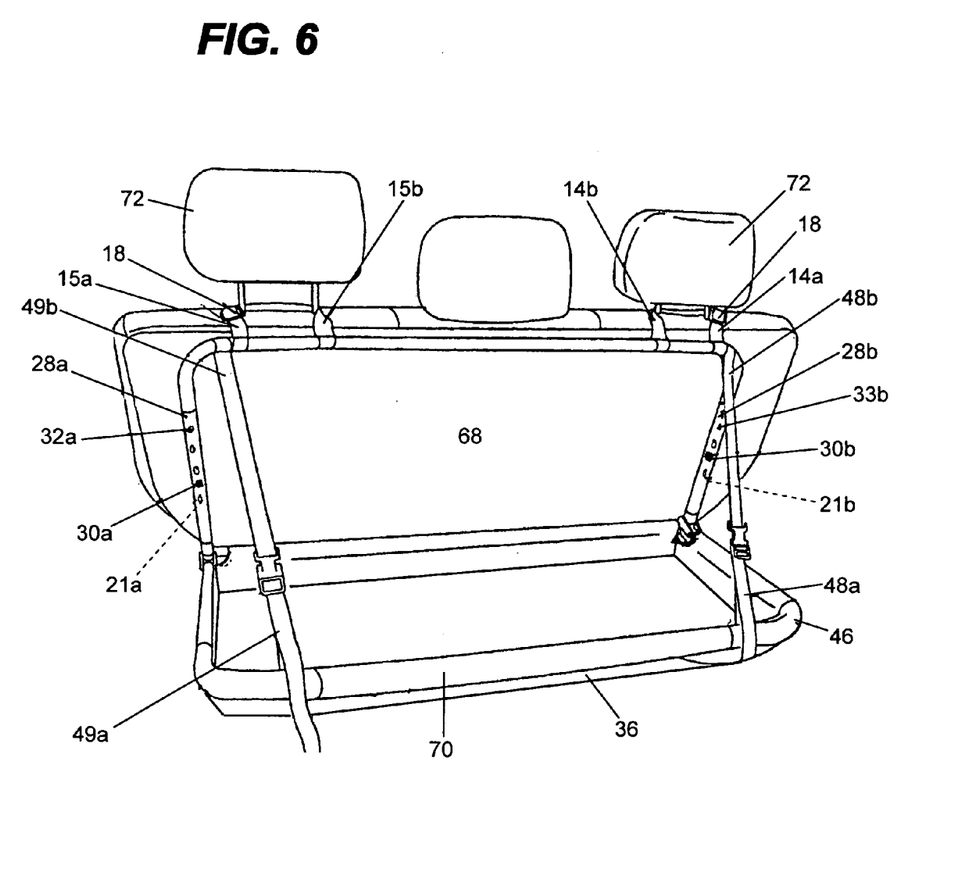
FIG. 6 is a perspective view of the cargo organizer system showing a cloth shelf.

Integrally attached atop the tube frame is a plurality of headrest mounting strap attachments 16. These attachments can be loops, snaps, buckles, hooks, rivets, or any other suitable attachment mechanism that is known in the art. In one non-limiting example, the attachments 16 are shown in FIG. 1 as being loops. The attachments 16 are capable of retaining a headrest mounting strap 14, 15. In alternate embodiment, the mounting straps can be a single strap that is retained by the strap attachments 16 by feeding the mounting strap 14 through the strap attachments 16, and reattached mounting strap 14 to itself. In such a configuration, the mounting strap 14 would have a first end 14a and a second end 14b. Each of these ends would be fitted with communicating buckles 18a and 18b that are capable of adjustable and releasable attachment with each other. The straps 14, 15 are fed through a plurality of attachments 16a, b, and around the base of a headrest 72 (as shown in FIG. 2). The buckles 18 are then releasably secure the strap in a loop, and adjusted such that the cargo organizer 10 is secured in a vertical position at the desired height against the back of a vehicle bench seat 68. In another embodiment, the mounting straps 14, 15 can comprise at least two straps with a first end of each strap being integrally attached to the attachments 16 as shown in FIG. 6. A second end of each strap would then be attached to one of the communicating buckles 18a and 18b. The two strap ends would then be attached at the buckles 18a, b, thus securing the organizer system to the vehicle bench seat.

In an alternative embodiment shown in FIG. 6, the mounting strap attachments 16 are eliminated, and the headrest mounting straps 14, 15 are looped around the top of the tube frame 12 and each is attached to itself. Thus, mounting to each headrest would require 2 straps with each of straps 14 and 15 comprising straps 14a, b, and straps 15a, b, each attached around the tube frame. The unattached ends of the straps 14a, b, 15a, b, are provided with an adjustable buckle such that tube frame can be secured at the desired height behind the bench seat, with straps 14a and 14b being in adjustable communication, and straps 15a and 15b being in adjustable communication by means of buckle 18.

Figure 4:
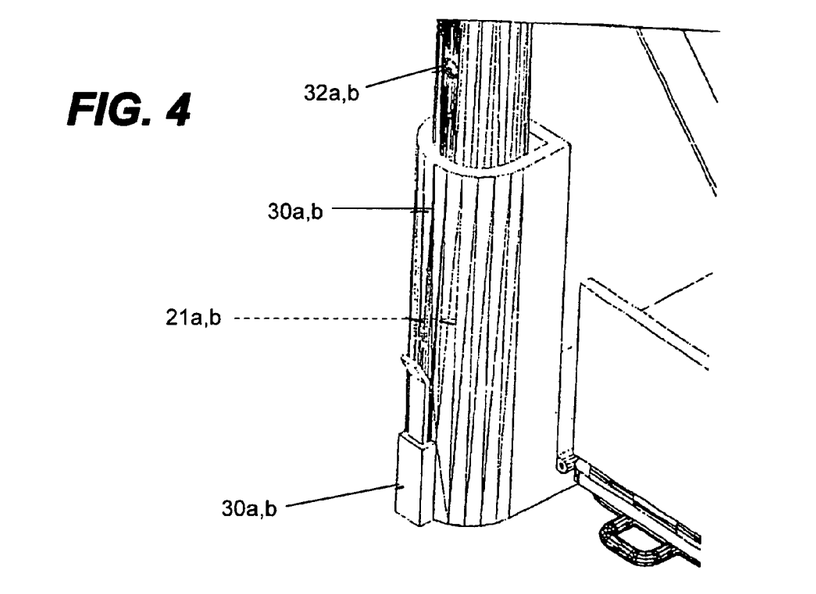
FIG. 4 is a perspective view of one embodiment of the tube frame locking mechanism for the cargo organizer system.

Frame ends 21a and 21b of the tubular frame 12 are inserted into corresponding adjustment assemblies 28a and 28b of the frame base 20. A tube frame locks 30a and 30b located on the adjustment assemblies 28a, 28b serve to retain the frame ends within the adjustment assemblies. In one embodiment, the tube frame lock 30a, b, comprises a v-spring type locking mechanism as is well known in the art, with corresponding pluralities of lock indents 32a, 32b located on the tubular frame 12. The tube frame locks 30a, b, are capable of retaining the frame base at a particular desired height as defined by the predetermined placement of the indents 32a, 32b. As used herein, indent is also meant to include holes that are capable of receiving the tube frame lock. The frame base 20 can then be adjusted to the desired height relative to the top of the tubular frame 12, and the floorboard of the vehicle. One of ordinary skill in the art would recognize that the v-spring type locking mechanism is only one of many types that can be utilized to retain the frame base in the desired position. Screw mechanisms, spring type indents, pin inserts and other means well known in the art are also contemplated.

In an alternative embodiment shown in FIG. 6, a v-spring locking mechanism 30a,b is held within the frame ends 21a and 21b. Indents 32a and 32b are located on the adjustment assemblies in positions corresponding to the v-spring lock. The frame ends 21a and 21b are then inserted into the adjustment assemblies 28a,b, such that the v-spring locks 30a, b, engage the corresponding indents 32a, b, and secure the frame base at the desired height. A plurality of indents is provided so that the frame base can be secured at a plurality of different predetermined heights.

Attached to the bottom of the adjustment assemblies 28a,b are two additional mounting straps 24a and 24b. The mounting straps are capable of extending around the back of the vehicle bench seat and attaching in front thereof. Preferably the mounting straps have a communicating buckle 26 that is capable of adjustably and releasably securing strap 24a to strap 24b. The mounting straps 24a,b adjustably secure the frame base 20 to the vehicle bench seat 68 to prevent any rotational movement about the headrest straps 14a,b while the vehicle is in motion and maintain the tube frame 12 in a vertical orientation against the back of the bench seat 68.

The base tray 36 is hingedly attached to the frame base 20, along the width of tray. The base tray 36 is therefore capable of rotating from a stored vertical position to a horizontal "in use" position. While in the stored position, the tray lies substantially flat against the back of the bench seat This allows for the totality of the cargo space in the vehicle to be utilized in hauling larger items where use of the cargo organizer is not practical, and the user does not want to remove the cargo organizer from the cargo area.

The base tray material 36 can optionally be formed into a waffled, honeycomb, or grid type pattern, allowing the tray to eliminate unwanted weight while maintaining its structural integrity. Such a honeycombed base tray can be utilized with or without an optional covering (not shown) for the tray.

Figure 3:
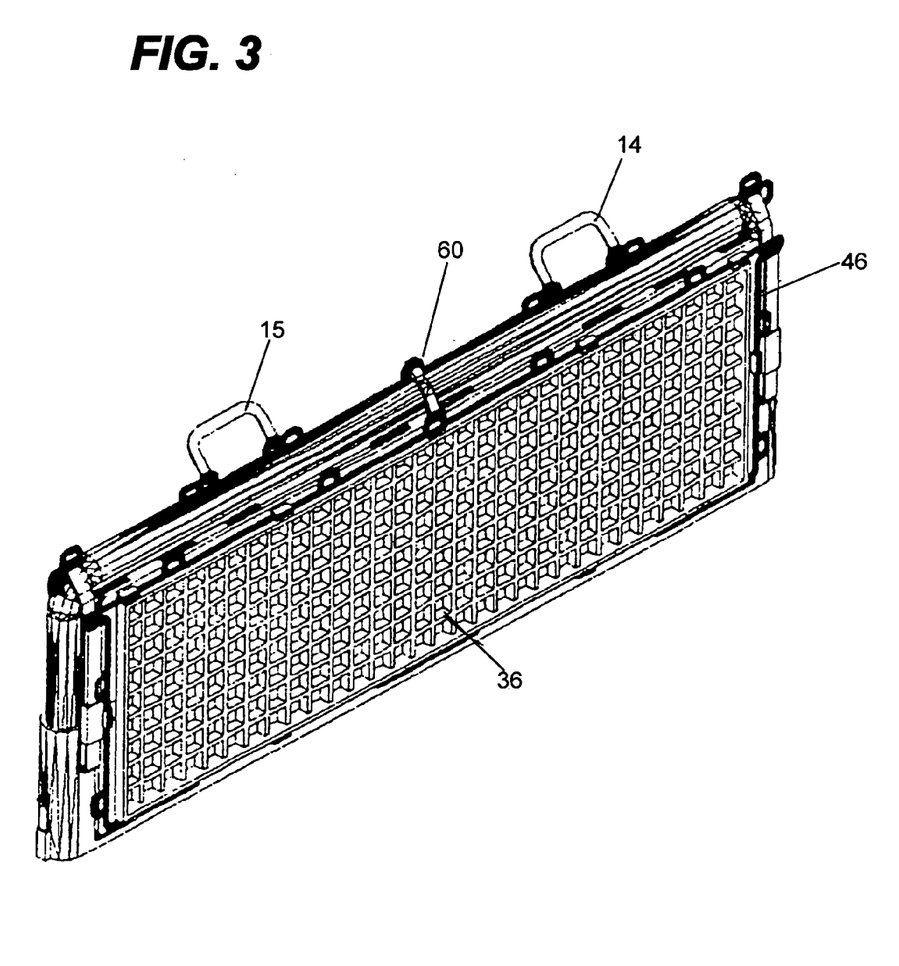
FIG. 3 is a perspective view of the cargo organizer system for a bench seat of a vehicle of FIG. 1 in a stored position.

In one embodiment of the cargo organizer 10, a latch strap 60 is integrally attached to the tubular frame 12. When the frame base 20 is rotated upward into the stored position, the latch strap engages a corresponding latch lock 62 located on the base tray 36. The latch strap 60 releasably retains the latch lock 62 so that the tray 36 is securely held in the "stored" position as shown in FIG. 3.

Figure 5:
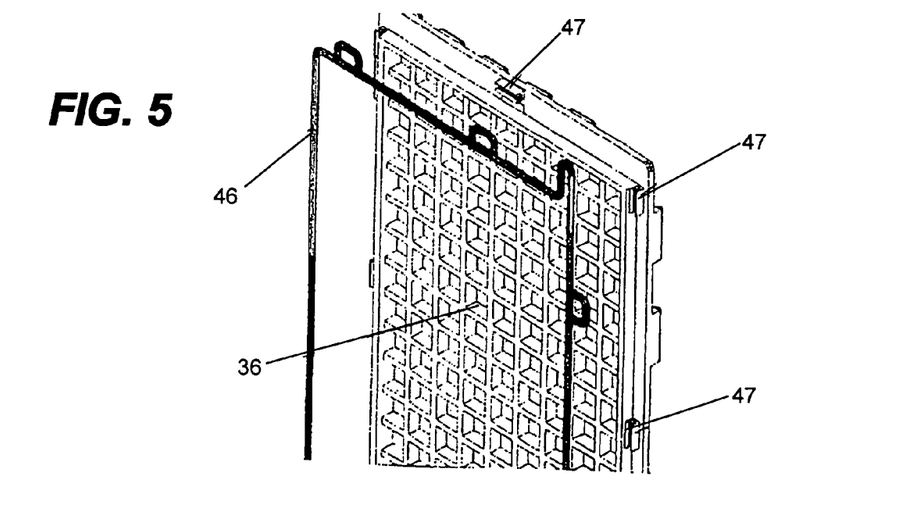
FIG. 5 is a perspective view of the tray frame and tray showing one method of attaching the frame thereto.

An optional tray frame 46 can be attached to the frame tray 36, preferably on the underside thereof. The tray frame 46 is preferably a metal or metal alloy support that substantially outlines the perimeter shape of the tray 36. The frame 46 can be attached to the tray 36 using any suitable means known in the art, although holding clips 47 are preferred. In an alternative embodiment, the tray 36 can be molded around the frame 46 so that the frame 46 forms a skeleton inside the tray 36.

In one embodiment, a plurality of tie down loops 56 extend from the tray frame 46 to provide attachment points for tethers, bungee cords, straps, or other devices designed to retain cargo with in the tray 36. In a specifically preferred embodiment shown in FIG. 2, the retention device is a cargo netting 58 that is attached to the tray frame at each of the plurality of tie down loops.

In an alternative embodiment not utilizing a tray frame 46, the tie down loops 56 can be integrally attached to the tray 36. Specifically preferred, these tie down loops 56 can be formed by injection molding such that they are integral with an injection molded tray 36.

Figure 7:
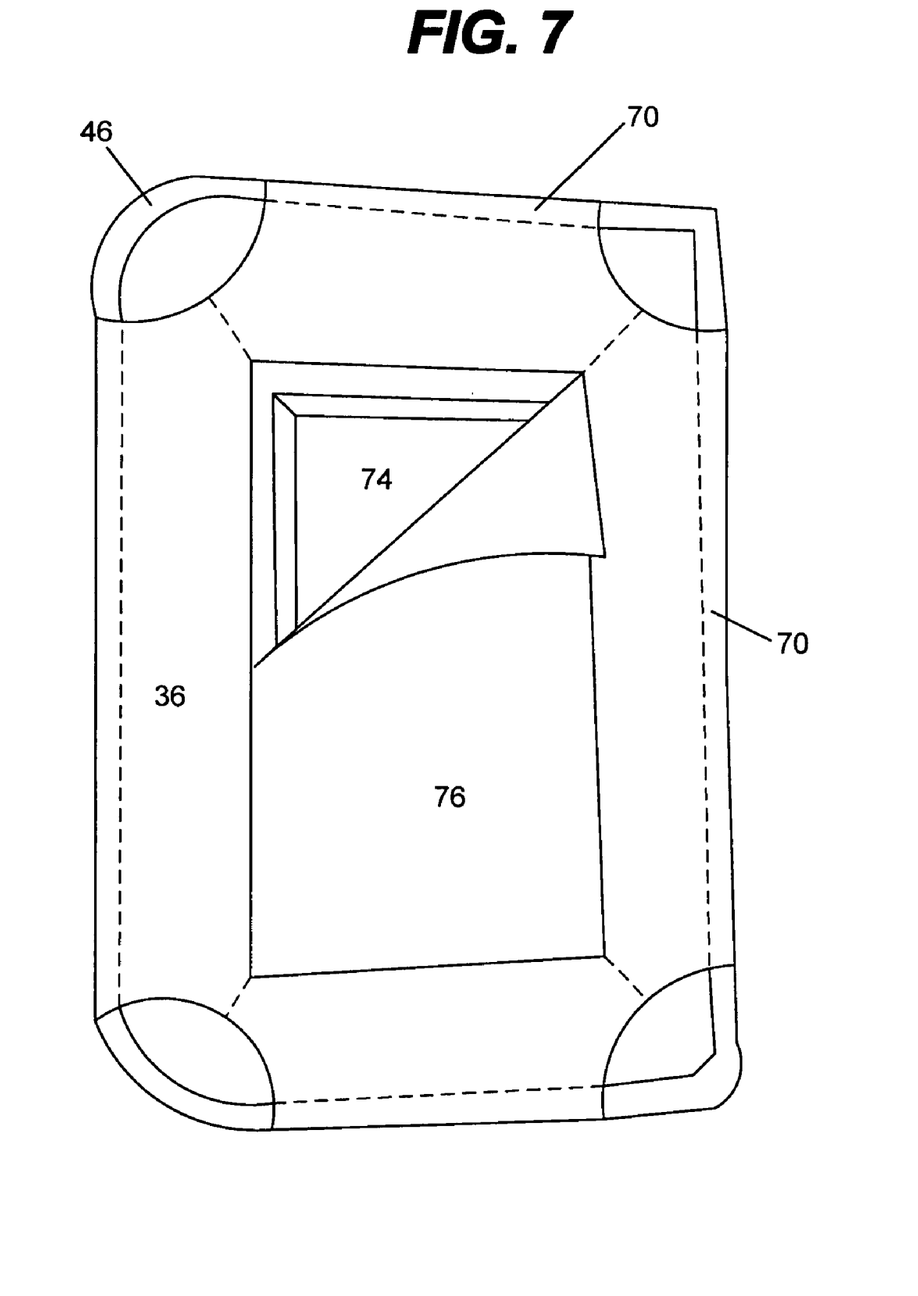
FIG. 7 is a perspective view of cargo organizer system of FIG. 6 showing the underside thereof.

In an alternate embodiment shown in FIGS. 6 and 7, the tray support frame 46 is itself hingedly attached to the frame base 20, and the tray 36 is formed out of a woven cloth-like material. The tray itself is larger than the tray support frame, so that when attached, the woven tray 36 will hang beneath the frame to form a bag-like retaining space within the frame perimeter in which to retain cargo. Preferably, the woven tray 36 is attached to the tray support frame 46 by stitching the edges of the tray support frame to itself so as to form a closed loop sleeve 70. The tray frame 46 can then be fed through the closed loop sleeve 70, or is placed inside the sleeve 70 before stitching. The woven material used to make the woven tray 36 can me any suitable material known in the art, including both natural and synthetic fibers or a combination thereof. As seen in FIG. 7, a support board 74 can be formed within a pocket 76 sewn or otherwise attached to the bottom of the tray 36. This support board can be formed out of any substantially rigid material, and provides a rigid support to prevent the concaving of the shelf when articles are placed thereon.

Formed integral with the tray support frame 46 are a plurality of tray frame attachment rings 54a,b. Preferably, the attachment rings 54a,b are formed by a extended loop in the tray support frame 46, with the loop 46 extending beyond the edge of the tray 36. Alternatively, when the tray 36 is utilized without the support frame 46, attachment rings 49 can be formed directly by molding the rings into the tray 36. Other embodiments also include d-rings, or other devices that can be attached directly to the tray support frame 46 or tray 36 by other means known in the art.

A pair of adjustable tensioning straps 48, 49 adjustably connect the tray frame attachment rings 54a,b to the tubular frame attachment rings 52a,b. Tubular frame attachment rings 52a,b, are located attached to the tubular frame 12. Preferably, tubular frame attachment rings 52a,b are located remote from the frame ends 21a and 21b in order to provide the greatest amount of support to tray 36. Tensioning straps 48a,b can be adjusted to support the tray 36, such that the tray 36 can provide a level surface regardless of the angle of incline the tubular frame 12 and frame base 20 forms with the floorboard. That is, even when the tubular frame 12 is not normal to the vehicle's floorboard, the tray 36 can be maintained in a parallel arrangement with the floorboard, so as to ensure that cargo held within the tray 36 will not tip over. In a preferred embodiment, each of the tensioning straps 48, 49 is a single strap with a first and second end. Each of these ends is fitted with communicating buckles 50a and 50b that are capable of adjustable and releasable attachment with each other. The strap 48a,b is looped through the frame attachment rings 54a,b and through the tubular frame rings 52a,b. The communicating buckles 50a and 50b are then releasably attached to one another, and adjusted to the desired degree of tension, preferably such that the tray 36 forms a level surface parallel with the vehicle's floorboard.

In an alternate embodiment as shown in FIG. 6, the tensioning straps 48, 49 can each comprise a plurality of straps 48a, 48b, 49a, and 49b. The straps 48a and 49a are looped around the tray fame, and attached to themselves, preferably by stitching. Similarly, straps 48b and 49b are secured to themselves around the tube frame with stitching. Straps 48a and 48b are supplied with corresponding adjustable buckles, as are straps 49a and 49b, so that the tray frame can be secured and maintained at the desired angle relative to the tube frame and frame base.

Optionally, side panels 38a,b and front panel 40 can be removably or hingedly attached around the periphery of the tray 36, thereby securing cargo that is placed atop the tray 36, and preventing such items from falling to the floorboard or out the tailgate of a vehicle that is currently being loaded or unloaded. When hinged to the tray 36, the front panel 40 and side panels 38a,b are capable of folding flat against the tray such that the entire tray can be folded into the vertical "stored" position. Alternatively, the front and side panels can be configured so that they can be removed from the tray, and stored separately therefrom. Similarly, divider panels 44 can also be pivotally or removably attached to the tray. A storage pouch 64 can be provided to facilitate storage of the removed front, side and divider panels. The storage pouch can be provided with fasteners that allow the pouch to be attached to the tube frame, to prevent misplaced pieces. Preferably, these fasteners are hook and loop type straps that can extend around the tube frame, however one of skill in the art would realize that any other suitable fastener could also be used.

Two additional mounting straps 18a, 18b are secured to the bottom vertical tubes 40a, 40b of the adjustable tube frame 20 and are securable at the ends 44a, 44b thereof about the base 46 of vehicle bench seat 12 to maintain the tube frame 20 in a vertical orientation against the back 38 of the bench seat 12. The height of the collapsible shelf 22 with respect to tube frame 20 is adjustable with a height adjustment mechanism including two adjustment assemblies 50a, 50b. Collapsible shelf 22 is pivotally secured along an edge 56 thereof to the bottom of the tube frame 20 and is moveable between a vertical stored position and a horizontal use position. The collapsible shelf 22 is supported in both the vertical stored and the horizontal use positions is supported in both the vertical stored and the horizontal use positions as determined by the selected lengths of the two adjustment assemblies 50a, 50b that are secured between the collapsible shelf 22 and the tube frame 20.

Collapsible shelf 22 is provided with a number of shelf connectable dividers 68 that are configurable in connection with the collapsible shelf 22 to form a number of separate shelf item retaining compartments 70. The item retaining netting assembly 76 is securable to either the collapsible shelf 22 and/or the tube frame 20 to secure and cover items supported on the collapsible shelf 22.

When some of the shelf connectable dividers 68 are removed from connection with collapsible shelf 22 the shelf connectable dividers are stored in a storage bag 80 that, when not used for storing the shelf connectable dividers 68, storage bag 80 is attached to the tube frame 20.

It can be seen from the preceding description that a cargo organizer system for a bench seat of a vehicle has been provided.

It is noted that the embodiment of the cargo organizer system for a bench seat of a vehicle described herein in detail for exemplary purposes is, of course, subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

We claim:

1. A cargo organizer adapted for removable attachment to the rear of a bench seat of a vehicle, said cargo organizer comprising:
   a tube frame comprising a first elongated horizontal member having a first end and a second end, and a first and second vertical member integrally attached to said first and second end, wherein said first vertical member comprises a first plurality of indents, said second vertical member comprises a second plurality of indents, and said first and second plurality of indents define a plurality of predetermined heights;
   a frame base comprising a first and second adjustment assembly connected by a second elongated horizontal member, said second horizontal member having a first frame edge, wherein said first adjustment assembly comprises a first tube frame lock, and wherein said second adjustment assembly comprises a second tube frame lock;
   a seat strap attached to said first adjustment assembly and said second adjustment assembly, said seat strap securing said cargo organizer to said the rear of the bench seat; and
   a shelf having a front edge, a rear edge, a first side edge, a second side edge, an underside, and at least one adjustable tensioning strap, said shelf being pivotally attached to said first frame edge of said frame base such that said shelf can be rotated from a substantially vertical position to a substantially horizontal position, wherein said underside comprises a tray frame attached thereto;
   a plurality of tie down loops located on a first, second, and third edge of the tray frame, wherein said plurality of tie down loops are operable to retain cargo within said shelf in conjunction with securing means;
   wherein said first vertical member is slidably and adjustably secured to said first adjustment assembly, and said second vertical member is slidably and adjustably secured to said second adjustment assembly;
   wherein said first vertical member is secured within said first adjustment assembly by said first tube frame lock at one of said first plurality of indents, and wherein said second vertical member is secured within said second adjustment assembly by said second tube frame lock at one of said second plurality of indents;
   wherein said plurality of predetermined heights define a vertical location of the frame base relative to the bench seat.

2. The cargo organizer of claim 1, wherein said tube frame further comprises a plurality of mounting strap attachments and mounting straps for securing said tube frame to headrests on the bench seat.

3. The cargo organizer of claim 2, wherein each of said mounting straps has a first and second end separated by a length, where said strap is adjustable.

4. The cargo organizer of claim 3, wherein each of said mounting straps comprises an attachment mechanism to secure the first and second ends together.

5. The cargo organizer of claim 4, wherein said attachment mechanism is selected from the group consisting of buckles, snaps, ties, and hook and loop material.

6. The cargo organizer of claim 5, wherein said attachment mechanism is capable of adjusting said length of said mounting strap.

7. The cargo organizer of claim 1, wherein said seat strap comprises a first strap having a first and second end, and a second strap having a third and fourth end, said first end being secured to said first adjustment assembly, and said third end being secured to said second adjustment assembly, wherein said second end and said fourth ends are capable of being adjustably and releasably secured to one another with an attachment mechanism.

8. The cargo organizer of claim 7, wherein said attachment mechanism is selected from the group consisting of buckles, snaps, ties, and hook and loop material.

9. The cargo organizer of claim 1, wherein said tube frame lock is of the type selected from the group consisting of box locks, v-spring locks, push-pin inserts, and screws.

10. The cargo organizer of claim 9, wherein said tube frame lock is a v-spring type lock.

11. The cargo organizer of claim 1, wherein said shelf further comprises a front panel attached to said front edge, a first side panel attached to said first side edge, and a second side panel attached to said second side edge so as to define an interior.

12. The cargo organizer of claim 11, wherein said shelf further comprises a plurality of divider panels that divide said interior into separate compartments.

13. The cargo organizer of claim 12, wherein any of said front edge, said first side edge, said second side edge, and said plurality of divider panels are removably attached to said shelf.

14. The cargo organizer of claim 12, wherein any of said front edge, said first side edge, said second side edge, and said plurality of divider panels are pivotally attached to said shelf.

15. The cargo organizer of claim 1, wherein said tray frame is made of a material selected from the group consisting of metal, metal alloy, thermoplastics and combinations thereof.

16. The cargo organizer of claim 15, wherein said tray frame is made of stainless steel.

17. The cargo organizer of claim 1, wherein said tube frame further comprises at least one top attachment loop, and said shelf further comprises at least one bottom attachment loop proximate said front edge, and wherein the at least one tension strap adjustably connects said top attachment loop to said bottom attachment loop.

18. The cargo organizer of claim 17, wherein said at least one tension strap maintains said shelf at an angle parallel with the floorboard of said vehicle.

19. The cargo organizer of claim 17, wherein said at least one tension strap further comprises a first and second end separated by a length wherein said first end and said second end are capable of being adjustably and releasably secured to one another with an attachment mechanism.

20. The cargo organizer of claim 19, wherein said attachment mechanism is selected from the group consisting of buckles, snaps, ties, and hook and loop material.

21. The cargo organizer of claim 1 further comprising a cargo netting capable of retaining objects on said shelf.

22. The cargo organizer of claim 1, wherein said shelf further comprises a tubular frame that defines a periphery of said shelf, and a woven cloth defining an interior space within said periphery.

23. The cargo organizer of claim 22, wherein said woven cloth is made of a material selected from the group consisting of natural fibers, synthetic fibers, and a combination thereof.

24. The cargo organizer of claim 22, wherein said shelf further comprises a pocket and a support board, said pocket being capable of receiving said support board to provide a substantially rigid surface for said shelf.

* * * * *